May 8, 1962 E. B. FOWLER ETAL 3,033,986
CHROMATOGRAPHIC METHOD AND APPARATUS
Filed May 23, 1958 3 Sheets-Sheet 1
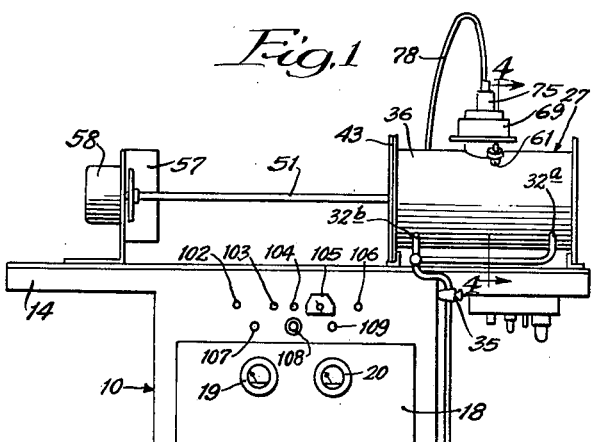
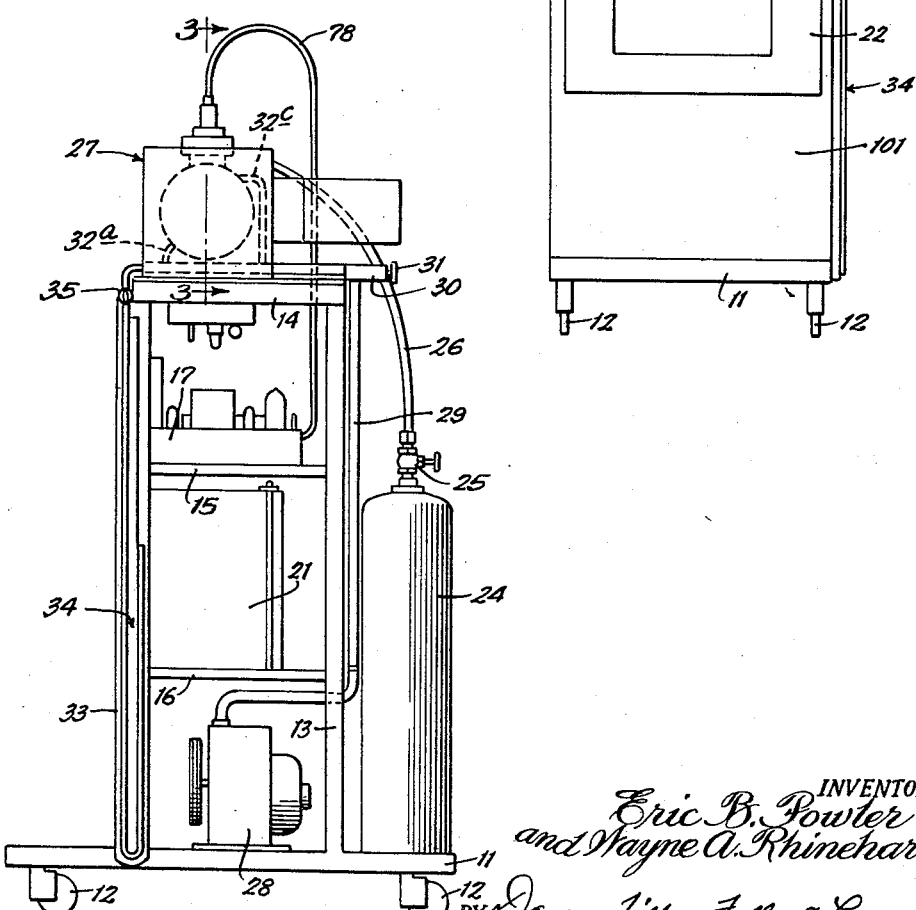
INVENTORS:
Eric B. Fowler
and Wayne A. Rhinehart,
BY Davern, Tilton, Falbor & Lungmus
ATTORNEYS.

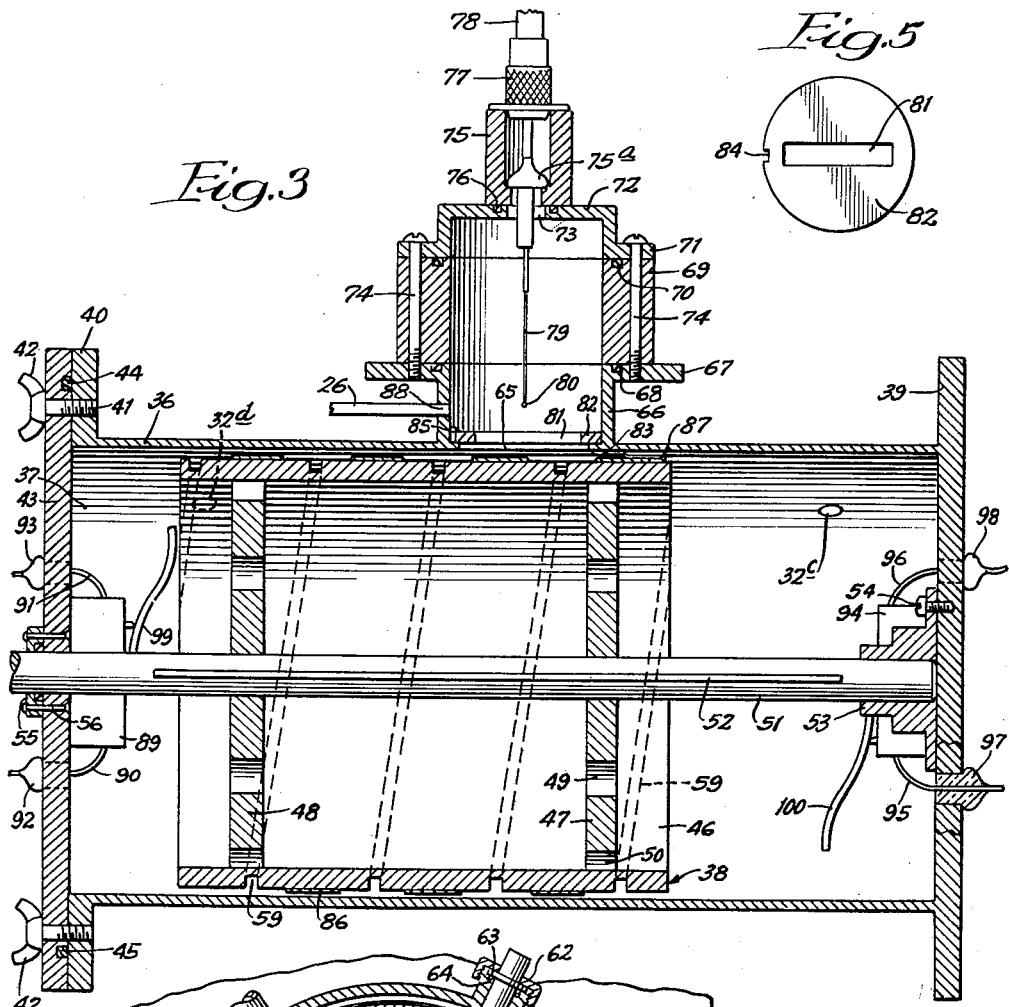
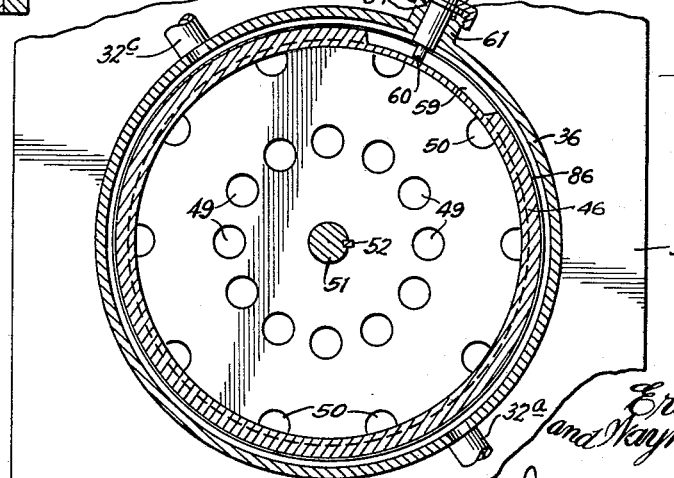

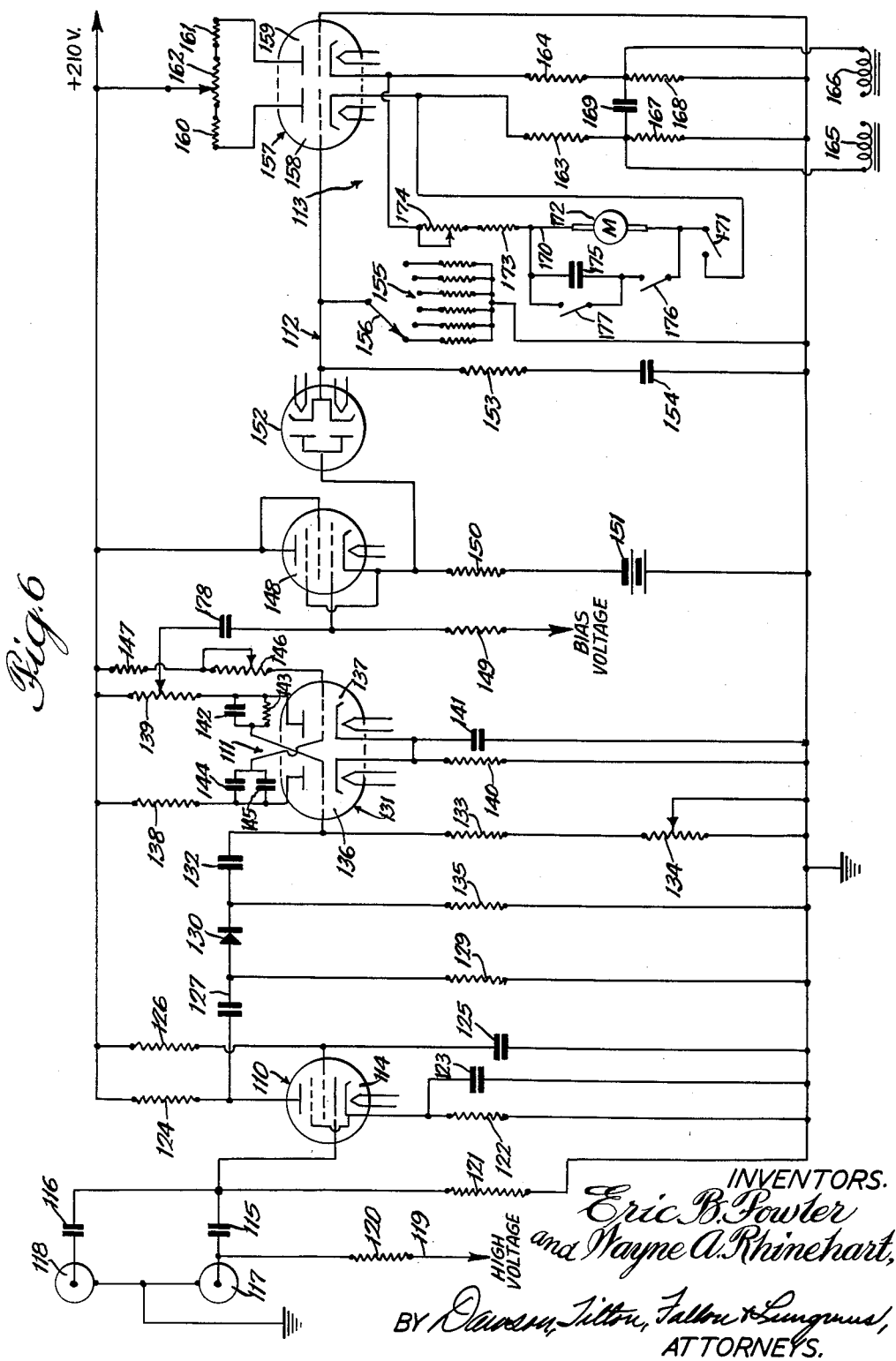

United States Patent Office 3,033,986
Patented May 8, 1962

3,033,986
CHROMATOGRAPHIC METHOD AND
APPARATUS
Eric B. Fowler, Los Alamos, N. Mex., and Wayne A. Rhinehart, Ames, Iowa, assignors to Iowa State College Research Foundation, Inc., Ames, Iowa, a corporation of Iowa
Filed May 23, 1958, Ser. No. 737,390
1 Claim. (Cl. 250—83.6)

This invention relates to a chromatographic method and apparatus and, more particularly, to such a method and apparatus employed in connection with a chromatogram having a radioactive tracer associated therewith.

This application is a continuation-in-part of our co-pending applications, Serial No. 529,177, filed August 18, 1955, now abandoned, and Serial No. 529,415, filed August 19, 1955.

Chromatographic techniques have been developed in recent years for the separation of components of heterogeneous mixtures. Separation is accomplished generally by placing such a mixture on a supporting medium, such as a paper or other cellulosic strip, and immersing one end of the medium in a multi-phasic solution so that the solution ascends or descends along the medium. Components of the unknown mixture will travel along the medium strip at different rates and thus be separated. The components may be identified later by spraying the strip with an indicator solution. Since micro amounts of each component may be detected in this way, the technique is valuable for the identification of products in an enzymatic reaction mixture wherein the concentration of the components is usually low.

Radio tracer techniques have also been recently developed and applied to the field of biology. The radio tracer method is now used extensively to demonstrate the up-take or incorporation of many compounds of biological systems. Tracer techniques may also be used to prove or disprove certain hypothesized chemical reactions. The up-take of $C^{14}O_2$ and its incorporation into amino acids, and hence protein of cellular systems, may be cited as an instance.

The combination of chromatographic and radio tracer techniques places in the hands of the research worker a valuable tool for the detection of products of reaction and their relationship to known precursors. By these two methods, micro amounts of a product can be separated at a high degree of purity, and the incorporation of labeled fractions demonstrated. However, the two techniques have been limited in application in that the element used extensively as a tracer ($C^{14}$) is difficult to detect by conventional means because of the low energy of its radiations. The flow type detector tubes available which were capable of detecting low activity were of such construction that the chromatographs had to be cut into small sections and the sections surveyed individually. Such a process is wasteful of both time and material. Isolated biological systems in general do not incorporate high concentrations of reactants, and since the activity associated with any one zone might appear in several sections, a dependable total count could not be obtained.

It is, accordingly, an object of this invention to provide a method and means for overcoming the limitations set forth above, and to thereby extend the applicability of radio-tracer and chromatographic techniques. Another object of the invention is to provide method and apparatus designed to solve many of the limitations heretofore present in the art and to provide a research worker with a dependable tool operative to increase the accuracy of his results, decrease the time required for any one demonstration, and to be of such an automatic nature as to require no attention after its being set in motion, thereby freeing the worker for other endeavors.

Still another object of the invention is to provide in chromatography a novel method and apparatus for determining the amounts of components of an unknown mixture having a radioactive tracer associated therewith, which components are supported on an elongated chromatographic medium. Yet another object is to provide a method and apparatus for ascertaining quantitatively the amounts of unknown components of a mixture disposed along a chromatographic strip and in which the quantitative measurement is reported in terms of a voltage symbol. A further object is to provide a method and apparatus for quantitatively determining the amounts of unknown components of a mixture having radioactive tracer means associated therewith in which the mixture is supported on an elongated chromatographic strip and in which the quantitative determination is reported on a chart of identical length so that the strip and chart can be placed side by side for visual comparison. Other objects and advantages of this invention will appear as this specification proceeds.

The invention will be described in conjunction with an illustrative embodiment, in the accompanying drawing, in which—

FIG. 1 is a front view in elevation of a scanning and recording apparatus useful in the practice of this invention; FIG. 2 is a side view in elevation of the apparatus shown in FIG. 1; FIG. 3 is a longitudinal sectional view of the sample box component of FIGS. 1 and 2 and taken along the line 3—3 of FIG. 2; FIG. 4 is a transverse sectional view of the sample box taken along the line 4—4 of FIG. 1; FIG. 5 is a top plan view of a resolution plate used in the apparatus and which is seen most clearly in FIG. 3; and FIG. 6 is a schematic circuit diagram of a count rate meter employed in connection with the practice of this invention.

The advance provided by the instant invention may be better appreciated when viewed with the background of the prior art in mind. Prior to the development of the instant invention, several methods were attempted to circumvent the limitations set out hereinbefore concerning the chromatographic and radio tracer techniques. One method entailed placing the chromatogram on sensitive film and obtaining a radio autograph which located the positions of the radioactive areas. However, high concentrations of activity were required for successful use of this technique, and the method lacks accuracy when total activity associated with "an active spot" is required. Further, the time required for film exposure is relatively long, and the results of an experiment are not immediately available.

A second technique involves the replicate chromatogrammed strips. One strip is sectioned, and each section counted or detected separately. If the sections are counted in a flow type counter, low activities are not a primary problem since in the flow counter the sample is placed in the tube, and there is no loss of counts due to window adsorption as in the end window tube. Disadvantages of this technique lie in the fact that a large number of small sections must be surveyed which require continued supervision of the counting mechanism over long periods and the use of large volumes of counting gas for the flow tube. For example, a 2" by 20" chromatogram strip will yield 160 half inch circular discs. Each disc must be mounted separately, which means that the flow tube must be opened, samples changed, the tube outgassed or flushed, and the sample counted. Assuming typical counting rates, each operation would require about thirty minutes, or a total of about eighty hours per 20" strip. Even so, the worker has only a poor estimate of the total activity at any one position of the strip, and the strip is useless for further study.

With the technique and apparatus herein being considered, the operation is simple and the results are highly accurate. Several strips may be surveyed or scanned with one loading, and constant supervision of the instrument is not necessary once selection of the type of survey has been made and the apparatus set in operation. A minimum amount of counting gas is needed for the survey, since the system is sealed and gas does not flow through the tube during operation of the apparatus. A double survey may be made in about seven and one-half hours automatically, as compared to over four hundred hours that would be required for a comparable survey in the disc-flow counter method. In addition, the total activity associated with the strip spot is read directly from the recorder chart, and the strip remains intact for further study. The position of activity is indicated on the recorder chart as well as the total activity; low activities are detected, and a permanent record of the results is obtained.

In referring to the drawings for a detailed descrpition of the apparatus, reference will first be made to FIGURES 1 and 2 showing the scanning and recording apparatus in its entirety. The apparatus is designated generally with the numeral 10, and for portability is carried on a base or platform 11 equipped with casters 12 and a vertically-extending frame 13 having a top wall 14 and intermediate shelves 15 and 16. Carried on the shelf 15 is a rate meter assembly 17 comprised of electronic circuits and components, and, as seen in FIG. 1, is provided with a front panel 18 having a voltmeter 19 and a micro ammeter 20. Mounted on the shelf 16 is a recorder 21 that may be a Brown recorder and is equipped with a front panel 22 (FIG. 1) having a central window 23 therein that provides visibility for the recording chart advanced by the apparatus of the recorder.

Mounted on the platform 11, as is shown in FIG. 2, is a tank 24 adapted to contain under pressure a volume of counting gas. For this purpose, an inert gas such as argon can be conveniently employed. The tank is equipped with a manually-operable valve 25 that leads into a conduit 26 which carries the gas into the chamber of a sample box 27. Platform 11 also supports a motor-driven pump 28 which can conveniently be a high vacuum pump and, if desired, may be of Cenco manufacture. The pump is connected to a manifold 29 that opens into a manifold extension 30 equipped with a Sylphon high vacuum shut-off valve 31. Extension 30 communicates with the sample box at four spaced-apart points through branch conduits designated by the numerals 32a through 32d. The frame 13 also carries a mercury manometer 33 having a meter stick 34. The manometer is connected to the manifold branch 30 through a valve 35 and is employed to measure the pressure of the counting gas within the sample box 27.

The sample box 27, referring now to FIGS. 3 and 4, comprises a generally cylindrical casing 36 providing a chamber 27 therein and a drum 38 mounted within the chamber 37. The casing 36, at one end thereof, is equipped with an end closure wall 39 that may be square-shaped, as seen in FIG. 2, and dimensionally is larger than the casing 36 so that it provides outwardly-extendnig flanges that may be employed in mounting the casing on the top wall 14 of the frame. At its opposite end, the casing 36 is equipped with an outwardly-extending perimetric flange 40 equipped with a plurality of spaced-apart threaded openings therein that are adapted to receive threaded screws 41. Screws 41 may be provided with wing-nut heads 42, which are employed in securing the end wall 43 to the flange 40. As is shown in FIG. 3, the end wall 43 is provided at a spaced distance inwardly from the edge thereof and along its inner face with an annular channel 44 having seated therein a sealing gasket 45. The end walls 39 and 43, in combination with the casing 36, provide a substantially fluid-tight chamber 37.

The drum 38 comprises a cylindrical shell or tube 46 that is hollow and is provided with spaced-apart wall members 47 and 48, each of which is equipped with a plurality of central openings 49 therethrough and peripherally located openings 50. The walls 47 and 48 have aligned central openings provided with keyways therein and a seat upon a shaft 51 equipped with a key 52 that is journalled for rotation adjacent the end wall 39 in a bearing 53 secured to the end wall by capscrews 54, and in a bearing 55 carried exteriorly of the end wall 43 and secured thereto by screws 56.

Referring now to FIGS. 1 and 3, it is seen that the shaft 51 extends outwardly from the end wall 43 and is connected through a gear reducer 57 to a synchronous motor 58. When the motor is energized, rotation of the shaft 51 rotates the drum 38 that is locked thereon to prevent relative rotational movement therebetween, but is free to move axially along the shaft. By means of appropriate gear ratios in the gear reducer 57, the rate of travel of the periphery of drum 38 may be made the same as the rate of travel of the recording chart on the Brown recorder, so that the movement of the chart and recorder is synchronized with the movement of the drum 38 within the chamber 37.

The tube or shell 36 of the drum 38 is provided about the circumferential outer surface thereof with a spiral channel or groove 59 which extends from end to end thereof. Adapted to ride in the spiral groove 59 is a guide pin 60 that extends through a boss 61 with which the casing 36 is provided. The boss 61 is threaded at its outer end and threadedly receives a cap 62 that bears downwardly on a flange 63 carried by the guide pin 60 to force the same into tight engagement with a resilient seal member 64, whereby the mounting for the guide pin 60 provides a substantially fluid-tight seal preventing the escape of gases from the chamber 37. It is clear from FIG. 4 that the portion of the pin 60 that rides in the groove 59 may be reduced in cross section. It will be appreciated that the rotation of the drum 38 will cause the drum to be moved axially or bodily along the shaft 51 because of the engagement between the guide pin and the spiral groove 59.

As is shown most clearly in FIG. 3, the casing 36 is provided along the wall thereof intermediate its ends with an opening 65 and with a short tubular conduit 66 that extends outwardly from the casing thereabout. The tube 66 is provided with a laterally-extending flange 67 that has an annular channel in the upper face thereof that receives a gasket 68. Seated upon the flange in covering relation with the gasket or seal member, is a short tubular section 69 provided with a seal member 70 that has seated thereon a laterally-extending flange 71 of an outer closure member 72 provided with a central opening 73 therein. Elongated bolts 74 secure the flanges 67 and 71 and the member 69 together. Extending outwardly from the closure member 72 about the opening 73 therethrough is a collar member 75 that bears against a seal 76 carried by the closure member 72 to establish a fluid-tight relation therewith. Collar member 75 has provided an internal shoulder at its lower opening onto which a Kovar glass seal 75a may be soldered to provide a fluid-tight relation thereby.

Secured to the collar 75 is a fitting 77 of a coaxial cable 78 that, as is shown in FIG. 2, is connected to the rate member assembly 17. The center conduit of the cable 78 is electrically connected to a detector element or anode 79 that may be a ten mil tungsten wire provided at its end with a a glass bead 80. The detector 79 is aligned with a resolution slot 81 provided in a plate 82 that seats on an annular flange section 83 provided by the casing 36 about the opening 65. The plate 82, as is shown best in FIG. 5, is provided with a notch 84 that receives therein a key 85 provided along the inner wall of the member 66. The resolution slot 81 has a predetermined area, and it will be appreciated that the plate 82 is readily removable and may be replaced with another having a resolution slot of greater or smaller area depending upon the degree of resolution that may be desired in a scanning operation.

The detector 79 through the slot 81 is adapted to detect the radioactivity of chromatogram strips 86 that are carried by the drum 38 about the outer surface of the tubular shell 46 thereof. The chromatogram strips are spirally wound about the shell 46 and may extend from end to end thereof. They may be secured in place by a plurality of Phosphor bronze clips 87. In an embodiment of the invention that has been successfully employed, three strips each 2" in width by 20" long may be secured to the shell 46 in end-to-end relation to provide a continuous chromatogram extending from end to end of the drum. Preferably, the drum 38 is formed of brass.

The member 66 is provided with a flow port 88 communicating with the conduit 26 that connects through the valve 25 to the counting gas container 24.

A micro switch 89 is carried by the end wall 43 and is provided with a pair of leads 90 and 91 that extend outwardly through the wall 43 and have, respectively, glass seals 92 and 93 thereabout. The end wall 39 carries a micro switch 94 having leads 95 and 96 extending therefrom outwardly through the end wall and through glass seals 97 and 98. All of the seal members function to provide a fluid-tight closure about the lead wires for the micro switches, and it has been found that Kovar seals may be employed to bond the glass to the metal end walls.

Referring back to FIG. 1, it is seen that the front panel 101 of the apparatus is equipped with a plurality of switch members designated with the numerals 102, 103, 104, 105 and 106. Also, pilot lights 107, 108 and 109 are provided. The switches respectively are the pump switch for controlling the motor of the pump 28, the master switch for controlling the power connection to the apparatus generally, a momentary switch, a selector switch, and a relay reset switch.

*Scanner Operation*

In the practice of the invention using the apparatus illustrated herein, the end wall 43 is released from its position of sealing engagement with the flange 40 and the drum 38 is moved bodily out of the casing 36. The chromatogram strip 86 is positioned about the shell 46 of the drum and is secured thereto by clips 87. If a plurality of short strips are placed in end-to-end relation about the drum, the end portions thereof may be secured together by tape or other appropriate means. The drum is then moved into the casing and is preferably positioned so that the starting end of the strip 86 is substantially adjacent the resolution slot 81 in the plate 82. The end wall 43 is then secured as is shown in FIG. 3.

In removing the drum 38 from the casing or returning it to position therein, the guide pin 60 may be withdrawn from engagement with spiral channel 59, or, alternatively, may be rotated until the guide pin 60 is released from the channel.

When samples or chromatogram strips are changed, the counting chamber 37 must be flushed and a fresh supply of counting gas undre pressure admitted thereto. In the system provided, it is not necessary to flush the chamber 37 continuously with counting gas prior to starting the run of a new sample. Such a procedure is undesirable, for it involves the use of large quantities of gas, which, is expensive. Instead, the pump 28 is actuated and the chamber 37, is evacuated, since the pump is connected thereto through the manifold 29, manifold extension 30 and branch conduits 32a through 32d. After evacuation, a supply of counting gas is admitted to the chamber 37 through the valve 25. Preferably, that volume of gas is then evacuated from the chamber and a fresh quantity of counting gas admitted thereto. Such a flushing procedure substantially eliminates contaminating gas which would interfere with counting tube operation.

To actuate the apparatus, the various switches are moved to the "On" position, and the motor 58 through the shaft 51 rotates the drum 38. As the drum rotates, the coaction of the guide pin 60 and spiral channel 59 causes the drum to move bodily axially within the chamber 37, or toward the right as viewed in FIG. 3. The chromatogram strip 86 then advances progressively beneath the resolution slot 81 and is scanned by the detector element or anode 79 of the scanning tube.

At the same time, the recorder 21 is functioning, and it is operatively coupled to the rate meter assembly 17, which in turn receives the counting impulses from the detector 79, and the radioactivity of the strip at the location beneath the resolution slot 81 is recorded directly on the chart of the recorder. Thus, both the amount or extent of activity and the precise location thereof on the strip 86 are directly recorded. This procedure is valuable, for after a test has been run, the strip 86 may be removed from the drum and placed beside the chart of the recorder so that the extent and exact location of the recorded activity can be transposed to the strip. The extent of activity may be determined by integrating the areas under the curves or pips on the recording graph.

The apparatus may be set up so that when the drum 38 engages the switch arm 100 of the micro switch 94, the apparatus will be deenergized. Thus, one pass or one complete scanning cycle of the strip 86 will have taken place. On the other hand, if it is desired to provide a double-scanning cycle, the selector switch is so positioned, and upon the drum striking the switch arm 100, the motor 58 is reversed and the drum will then move axially to the left within the chamber 37 until it engages the arm 99 of the micro switch 89 which functions to deenergize the apparatus. By a suitable means, the recorder chart is marked at the end of the forward scan. In such a scanning cycle, strip 86 will be scanned first in one direction and then in the other.

The plate 82 is removably mounted within the member 66 which permits a plurality of plates 82 to be interchanged with each other. The various plates will have resolution slots 81 of different size, whereby the degree of resolution of the scanning operation may be selected by the operator. Ordinarily, the narrower the slot 81, the greater will be the degree of resolution. It is also desirable to reduce the operational speed of the apparatus where greater resolution is being provided by a smaller resolution slot 81. This may be done by changing the gear train in the recorder and the gear train in element 57.

The amount of counting as consumed in operation of the apparatus is maintained at a minimum because no gas flows through the counting chamber 37 during the testing or scanning of a strip. The only gas movement through the chamber comes during the flushing operation prior to the scanning of a new test sample. The operation is substantially automatic, and once the apparatus is set in motion and the mode of operation selected, attention from an operator is unnecessary for the apparatus scans and records automatically and terminates its own operation upon the completion of a scanning cycle, whether the cycle be a single or a double-scanning cycle.

Apparatus in the nature of a count rate meter especially designed for the low counting rates detectable by the scanner shown in FIGS. 1–5, is depicted schematically in FIG. 6. Basically, the count rate meter comprises an amplifier section, generally designated by the numeral 110, a pulse generating circuit or pulsing network generally designated by the numeral 111, an integrating circuit 112, and a metering section generally designated by the numeral 114. Generally stated, the circuit functions to receive voltage pulses and to provide a direct current output voltage which is proportional to the counting rate, or rate of the received voltage pulses at any given time. The voltage output may be utilized to provide a reading on a count rate meter, and it also may be utilized in an automatic recorder. The amplifier unit 110 comprises an electron discharge tube 114 that may be a 6AK5. The control grid of the tube 114 is connected through capacitors 115 and 116 to the respective center leads of coaxial cables 117 and 118 which have the outer or shield wires thereof grounded. It is intended that only one of the coaxial cables 117 or 118 be employed to couple the amplifier unit 110 to the anode wire of the detector 79. Coaxial cable 117 can be directly coupled to detector 79, in which case lead line 119 is connected to a source of high voltage, lead line 119 having resistor 120 interposed therein and connected at the junction point of capacitor 115 and coaxial cable 117.

Superior results are achieved when cable 118 is coupled to detector 79 through a cathode follower (not shown), the cathode follower deriving a voltage pulse signal from detector 79. When cable 118 is so connected, no voltage is applied to lead line 119 and, instead, plate voltage is applied to the cathode follower in a conventional manner. The advantage of using the cathode follower is that it isolates the coaxial cable capacities from the detector 79, resulting in larger voltage pulses from the detector and giving a more uniform and reliable performance of the detector since its operation is independent of the length of the cable 118.

For the most part, the circuit elements arranged with the amplifier tube 114 are conventional, and comprise a grid resistance 121, cathode resistance 122 and by-pass capacitor 123, and an anode resistor 124. The screen grid of the tube is connected to ground through capacitor 125, and is connected to B plus through a resistor 126. The amplifier unit serves to amplify the voltage pulses fed to the control grid thereof.

The anode of the amplifier tube 114 is connected through a differentiating circuit 127 comprising a capacitor 128 and resistor 129 and a crystal diode 130, which may be 1N38A, to the control grid of the duplex tube 131, which may be a 5963. A capacitor 132 is interposed between the crystal diode 130 and a control grid of the tube 131, and the grid is grounded through a fixed resistor 133 and potentiometer 134. A fixed resistor 135 has one side thereof grounded and the other side connected between the crystal diode 130 and capacitor 132.

The tube 131 comprises a part of the pulse generating circuit 111 and has two triode sections, those being designated for purposes of identification with the numerals 136 and 137. The grid of the tube section 136 is connected to the coupling capacitor 132. The tube 131 and the circuit elements associated therewith comprise a univibrator that functions to give a standard, uniformly shaped rectangular pulse for each pulse received thereby.

The anode of the tube section 36 is connected to B plus through a resistor 138, and the anode of the section 137 is connected to the same voltage source through a potentiometer 139. The cathodes of the tube sections are connected together and are connected to ground through a resistor 140 and capacitor 141 in parallel therewith. The control grid of the tube section 136 is connected directly to the anode of the section 137 through a parallel arranged capacitor 142 and resistor 143. The control grid of the section 137, in turn, is connected to the anode of the section 136 through parallel arranged capacitors 144 and 145. That same grid is connected to B plus through a potentiometer 146 and fixed resistance 147. The potentiometer 146 is arranged to provide an adjustment of the pulse width produced by the pulse generating circuit 111.

The output of the pulsing network or univibrator is connected to the control grid of a cathode follower 148, which may be a 6AU6. The adjustable tap of the potentiometer 139 in the anode circuit of the univibrator tube section 137 is connected through a capacitor 178 to the control grid of the cathode follower and provides a means for adjusting the magnitude of the signal fed thereto. The control grid is connected through a resistor 49 to a source of bias voltage. The anode of the cathode follower tube 148 is connected directly to the B plus voltage, and the cathode is connected through a resistor 150 and source of D.C. potentials such as the battery 151 to ground.

The cathode follower, and particularly the cathode thereof, is connected to the interconnected anodes of a diode coupler 152, which may be a 6AL5. The cathodes of that tube are connected together and are connected to the integrating network 112 that comprises a fixed resistor 153 in series with a capacitor 154 connected between the cathodes and ground, and one of a plurality of fixed resistors designated together by the numeral 155 that are all connected to ground and are adapted to be connected selectively through a switch 156 to the cathodes of the tube 152. Switch 156 in FIG. 1 corresponds to selector switch 105 seen in FIG. 1. Through the operation of switch 156, any one of the six fixed resistances comprising the bank 155 may be connected in parallel with the series connected resistance 153 and capacitor 154.

The counting range of the circuit is determined by the particular resistance in the bank 155 to which the switch 156 is connected. In the illustration given, six counting ranges are afforded, and preferably these ranges in counts per minute are zero to 100, zero to 200, zero to 400, zero to 800, zero to 1,600, and zero to 3,200. It is apparent that the switch 156 is adapted to be manually manipulated, and preferably will be located so that it can be controlled from the front panel of the counting meter.

The integrating circuit or unit 112 is connected to the vacuum tube bridge 113, which comprises a duplex tube 157 having two triode sections 158 and 159. The tube 157 may be a 5692. The respective anodes of the sections 158 and 159 are connected together through fixed resistors 160 and 161, and potentiometer 162 connected serially therebetween. The center tap of the potentiometer is connected directly to B plus which may be about 210 volts D.C.

The control grid of the section 159 is grounded, and the control grid of the section 158 is connected directly to the cathodes of the diode coupler 152. The cathode of the section 158 and the cathode of the section 159 are connected respectively through resistors 163 and 164 to the inductance coils 165 and 166, respectively. Coils 165 and 166 are connected to a recorder, such as a Brown recorder made by the Minneapolis-Honeywell Company. Since recording devices are commercially available, and are, therefore, known in the art, only the coils 165 and 166 which connect to such a recorder are shown in the drawing in circuit arrangement with the counter unit. As is seen in the drawing, the resistors 163 and 164 are grounded respectively through fixed resistances 167 and 168, and the upper ends thereof are connected together through a capacitor 169.

Connected in parallel with that portion of the cathode circuits of the sections 158 and 159 which provides the indicia or information utilized in an automatic recorder, is an indicating meter circuit designated generally with the numeral 170. For that circuit, the cathode of the section 158 is connected through a switch 171 to one side of the count rate meter 172, and the other side of that meter is connected through a fixed resistor 173 and potentiometer 174 to the cathode of the tube section 159. The meter 172 may be a zero to 50 microampere meter. In parallel with the meter 172 is a capacitor 175 connected serially with a switch 176. Shunting the capacitor 175 is a switch 177. It will be apparent that when the switch 171 is open, the meter 172 will be disconnected. When the switch 171 is closed, the meter circuit will be completed—but when the switches 176 and 177 are also closed, the meter 172 will be short-circuited. If the switch 177 is open but the switches 171 and 176 are closed, the meter circuit will be completed and the meter will be shunted by the capacitor 175. The meter 172 is adapted to provide a reading at the face of the count rate meter of the rate at which voltage pulses are being fed into the counting circuit.

In the operation of the circuit, voltage pulses are applied to the control grid of the amplifier tube and are amplified in that tube, and the amplified output pulses thereof are differentiated in the network 127 and are fed through the crystal diode 30 to the control grid of the input section 136 of the univibrator tube. The voltage pulses appearing at the anode of the crystal diode 130 are positive pulses. These pulses trigger the univibrator circuit, and that circuit produces one pulse having predetermined characteristics for each triggering pulse applied to the grid of the section 136. The output pulse of the univibrator tube, which is coupled to the control grid of the cathode follower tube 148, is a rectangular wave that is preferably about 200 microseconds in duration and rises to a peak positive voltage of about 116 volts.

The rectangular-wave pulses are coupled through the cathode follower 148 to the integrating circuit 112. More specifically, the pulses are fed from the cathode follower through the diode coupler to the charging capacitor 154 of the integrating network. Due to the RC function of the integrating network, a D.C. voltage is obtained which is proportional to the rate at which pulses are being coupled thereto. This D.C. voltage is then fed to the vacuum tube bridge-type circuit 113 which produces the voltage for the automatic recorder and for the indicating meter 172. The integrating time may be varied by selective adjustment of the switch 156 to place the resistance of desired value in the integrating circuit. On the lowest counting range, zero to 100 counts per minute, the integrating time is approximately thirty seconds. The circuit provides output readings that are accurate to approximately one percent from random pulses.

Thus, through the apparatus just described, it is possible to provide an accurate determination, quantitatively, of the unknown components of a mixture having a radioactive tracer associated therewith. The mixture is supported on a chromatographic strip, usually of cellulosic origin such as paper, and one end of the strip is placed in a solution. Thereafter, the travel of the solution along the strip effectuates a separation of the various components, due to the different rates of travel of the components along the strip in company with solution. When such a chromatographic separation has been achieved, the strip is mounted in the sealed chamber or sample box 27, which has been previously purged of any previously-employed counting gas. New counting gas is then introduced, and the strip advanced past the detector 179. Simultaneously, the counting meter of FIG. 6 is energized and a continuous record of the information reported by the detector is recorded. Since the record chart of the recorder can be made to the same lengths as the paper strip, the record of the radioactivity of the strip, and hence the amount of the unknown components, will appear at those positions on the recorder chart that can be aligned directly with the strip itself. If desired, the strip can be advanced reversely past the detector so as to obtain a second record of the character of the strip. Thereafter, the strip is removed from the sample box 127 and can be placed side-by-side with the record chart to afford a visual indication of the radioactivity of different portions of the strip. To complete the analysis, the strip can thereafter be treated with suitable indicator means to bring out the qualitative character of the components heretofore analyzed for concentration.

While in the foregoing specification an embodiment of the invention has been set forth in considerable detail for the purpose of completely describing the invention, it will be apparent to those skilled in the art that numerous changes may be made without departing from the spirit and principles of the invention.

We claim:

In apparatus for ascertaining the amounts of components of an unknown mixture having a radioactive tracer associated therewith and supported on an elongated chromatographic supporting medium, a casing providing a sealable chamber therein, scanning means within said chamber adapted to report the strength of radioactive emanation associated with various portions of said medium, a cylindrical drum adapted to carry an elongated chromatographic strip in spirally wound fashion on the outer surface thereof, means for supporting said drum for rotational and axial movement in said chamber to position successive portions of said strip in alignment with said scanning means, means coupled to said scanning means for producing voltage pulses proportional to said emanation, means for measuring the frequency of said pulses, pump means coupled to said chamber for evacuating gas from said chamber, and means for introducing counting gas into said chamber between evacuations.

References Cited in the file of this patent

UNITED STATES PATENTS

| 2,490,298 | Ghiorso et al. | Dec. 6, 1949 |
| 2,590,925 | Borkowski | Apr. 1, 1952 |
| 2,751,505 | Anderson | June 19, 1956 |

OTHER REFERENCES

Use of Beta-Ray Densitometry in Paper Chromatography, Analytical Chemistry, v. 23, #1, pages 207–208, January 1951.

Wingo: Apparatus for Automatically Scanning Two-Dimensional Paper Chromatograms for Radioactivity, Analytical Chemistry, vol. 26, July–December 1954, pp. 1527–1528.